United States Patent [19]

Moodie

[11] 4,214,822
[45] Jul. 29, 1980

[54] MULTIPURPOSE FILM CASSETTE HAVING ONE-PIECE ROTATING PROCESS MODE SWITCH

[75] Inventor: Donald E. Moodie, Marblehead, Mass.

[73] Assignee: Polaroid Corporation, Cambridge, Mass.

[21] Appl. No.: 63,672

[22] Filed: Aug. 6, 1979

[51] Int. Cl.² .................... G03B 23/02; G03C 11/00
[52] U.S. Cl. .................................. 352/78 R; 352/130
[58] Field of Search .................. 352/72, 78 R, 130

[56] References Cited

U.S. PATENT DOCUMENTS

| | | | |
|---|---|---|---|
| 3,778,140 | 12/1973 | Land | 352/130 |
| 3,785,725 | 1/1974 | Batter et al. | 352/130 |
| 4,003,064 | 1/1977 | Mason | 352/130 |

Primary Examiner—Monroe H. Hayes
Attorney, Agent, or Firm—Frederick A. Goettel, Jr.

[57] ABSTRACT

A multipurpose film handling cassette of the type in which a photographic film strip is exposed, processed and projected without removal of the film from the cassette is provided with a one-piece indicating element for signaling to the apparatus with which it is to be used the unprocessed or processed condition of the film within the cassette. A contact element is mounted within the cassette for rotation about a fixed axis from a first position wherein it will operatively engage a signal generating terminal of the apparatus thereby indicating a given process condition of the film within the cassette, to a second position wherein it will not operatively engage the signal generating terminal of the other apparatus thereby indicating a different process condition of the film in the cassette.

9 Claims, 6 Drawing Figures

MULTIPURPOSE FILM CASSETTE HAVING ONE-PIECE ROTATING PROCESS MODE SWITCH

BACKGROUND OF THE INVENTION

This invention relates to multipurpose film cassettes of the type in which a photographic film strip is exposed, processed and projected without removal from the cassette and, more particularly, it concerns a novel arrangement for indicating the processed or unprocessed condition of the film strip within such a cassette.

U.S. Pat. No. 3,641,896, issued to Rogers B. Downey, et al., on Feb. 15, 1972; and U.S. Pat. Nos. 3,778,140 and 3,800,306, issued respectively on Dec. 11, 1973 and Mar. 26, 1974, to Edwin H. Land, contain exemplary disclosures of a motion picture system by which a supply of light sensitive film contained in a multipurpose cassette can be exposed in a camera adapted to receive the cassette and then processed or developed to provide the conventional series of positive transparent image frames by placing the cassette in a viewing apparatus capable of activating a processor also contained in the cassette. Thus, once the film strip has been exposed, the image sequence recorded thereon may be viewed by projection afer a time interval only as long as that required to rewind the film strip, the processing operation being performed on the film during this initial rewind.

Of the many components required for satisfactory operation of such systems, the film cassette and the processor contained therein are perhaps most critical. For example, the development of transparent image frames on the light sensitive emulsion of the film strip after exposure in the camera of the system requires the deposit of processing fluid on the film strip. This is accomplished by expressing processing fluid through an orifice to a moving run of the film strip during the processing cycle. After the processing fluid is released upon initiation of the processing cycle, it must be deposited uniformly across the width of the emulsion as well as uniformly along the full useful length of the film strip with a high measure of reliability inasmuch as any non-uniformity or discontinuity in the layer of processing fluid deposited on the film strip will result in undesirable blemishes plainly observable in the images to be viewed. When the processing operation has been completed, any excess processing fluid within the cassette must be secured against leakage to the overall cassette interior. Finally, provision is made in the cassette for indicating whether the film strip has been processed or not inasmuch as the operating mode of the viewing apparatus in which the cassette is inserted after exposure is different for a cassette containing an exposed unprocessed film strip than it is for a cassette containing an exposed and processed film strip. Exemplary disclosures of such a motion picture film system having means for indicating the processed or unprocessed condition of the film strip within such a cassette are shown in the above-cited U.S. Pat. No. 3,778,140 as well as U.S. Pat. No. 3,785,725, issued to J. F. Batter, Jr., et al, on Jan. 15, 1974, and U.S. Pat. No. 4,003,064, to P. B. Mason, issued on Jan. 11, 1977.

In a typical system, the multipurpose film cassette is provided with a processed/unprocessed indicating means in the form of an internal electrical connection between two external electrical contacts which are accessible from the outside of the cassette housing. The internal electrical connection between the contacts is broken when the film is first rewound back onto the supply reel during processing. The existence of an electrical continuity between the two contacts indicates an unprocessed film, while an electrical discontinuity between the contacts indicates a processed film. The viewer/processor into which the cassette is inserted is provided with a control system which includes an operating cycle selector which is responsive to the cassette film condition indicating means to condition the control system for either a processed-film operating cycle or an unprocessed-film operating cycle.

Typically, a valve member, which is slidably mounted within the cassette and which is displaceable upon completion of processing to disable the film processing means, is used to form the internal electrical connection mentioned above. The valve member comprises a metallic portion which is movable, responsive to film advancement in a given direction following processing, from a first position wherein it provides the desired electrical interconnection to a second position wherein the valve member serves to disable the cassette-contained processor and wherein it no longer serves to provide an electrical connection between the two contacts.

In addition to the functional importance of the cassette- contained components in the operation of the system, the cassette is preferably a package for both the supply of film and the processing fluid from the point of manufacture to use by the consumer. The cassette also serves as a permanent container for the exposed and processed film strip during storage and subsequent projection cycles. In this respect, therefore, the processing components contained in the cassette can be considered as disposable in light of their being used only once with each cassette manufactured. This aspect of the cassette adds a still further requirement; that is, that the processing components as well as other cassette components be inexpensive and capable of mass production without detracting from operational performance in effecting the processing operation. Although the cassette structure illustrated in the above-mentioned U.S. patents, as well as other patents and pending applications commonly owned by the assignee of the present invention, have evidenced significant success from the standpoint of achieving system objectives, there is a need for simplification and corresponding cost reduction in the cassette components which it is desirable to be capable of making by mass production manufacturing techniques. Further in order to reduce production costs, it is desirable to minimize the number of components in a cassette as well as to simplify the assembly process.

SUMMARY OF THE INVENTION

The invention is broadly directed to a multipurpose film handling cassette of the type in which a photographic film strip is exposed, processed and projected without removal from the cassette. The cassette includes a novel arrangement for indicating to the processor/viewer the unprocessed or processed condition of the film within the cassette.

In its illustrated embodiment, the cassette includes a parallelepiped-like housing having at least one opening in one of its exterior walls. An indicating element is mounted within the housing in a first position wherein a portion of the indicating element extends through the opening to operatively engage a signal generating arrangement carried by the processor/viewer apparatus when the cassette is in operative engagement with the processor/viewer. Such operative engagement indicates to the processor/viewer a processed or unprocessed condition of the film in the cassette, as the case may be. The indicating element is mounted so that it may be rotated about a fixed axis from its first position to a second position wherein the indicating element will not operatively engage the signal generating arrangement of the other apparatus, when the cassette is installed therein, thereby indicating a different process condition of the film in the cassette. A selectively operable means is provided in the cassette which is actuatable responsive to the processing operation of the cassette for engaging and rotating the indicating means about its fixed axis from its first position to its second position thereby indicating such change in the process condition of the cassette.

More specifically, the indicating element comprises a metal plate portion arranged for rotation about a fixed axis defined by interior cassette structure. The base plate employs a pair of electrically conductive appendages adapted to pass through a pair of mating openings in the cassette housing to a position wherein they will engage a pair of electrical contacts carried by the viewer/processor apparatus when the cassette is installed therein. The indicating element is also provided with an upstanding appendage which is engaged by a slidably displaceable valve mounted within the cassette such that displacement of the slidable valve from a first position when the cassette is unprocessed to a second position when a cassette has been processed, will engage and rotate the indicating element from its first position when the cassette is unprocessed to its second position when a cassette has been processed. Such movement of the indicating element results in movement of at least one of the cassette-contained contacts to a second position wherein it will not electrically contact its mating electrical contact carried by the viewer or processor, thus resulting in an open circuit between the pair of electrical contacts carried by the viewer or processor when a processed cassette is installed therein.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been applied in the different figures to denote the same parts and wherein:

DESCRIPTION OF THE PREFERRED EMBODIMENT

Figure 1:
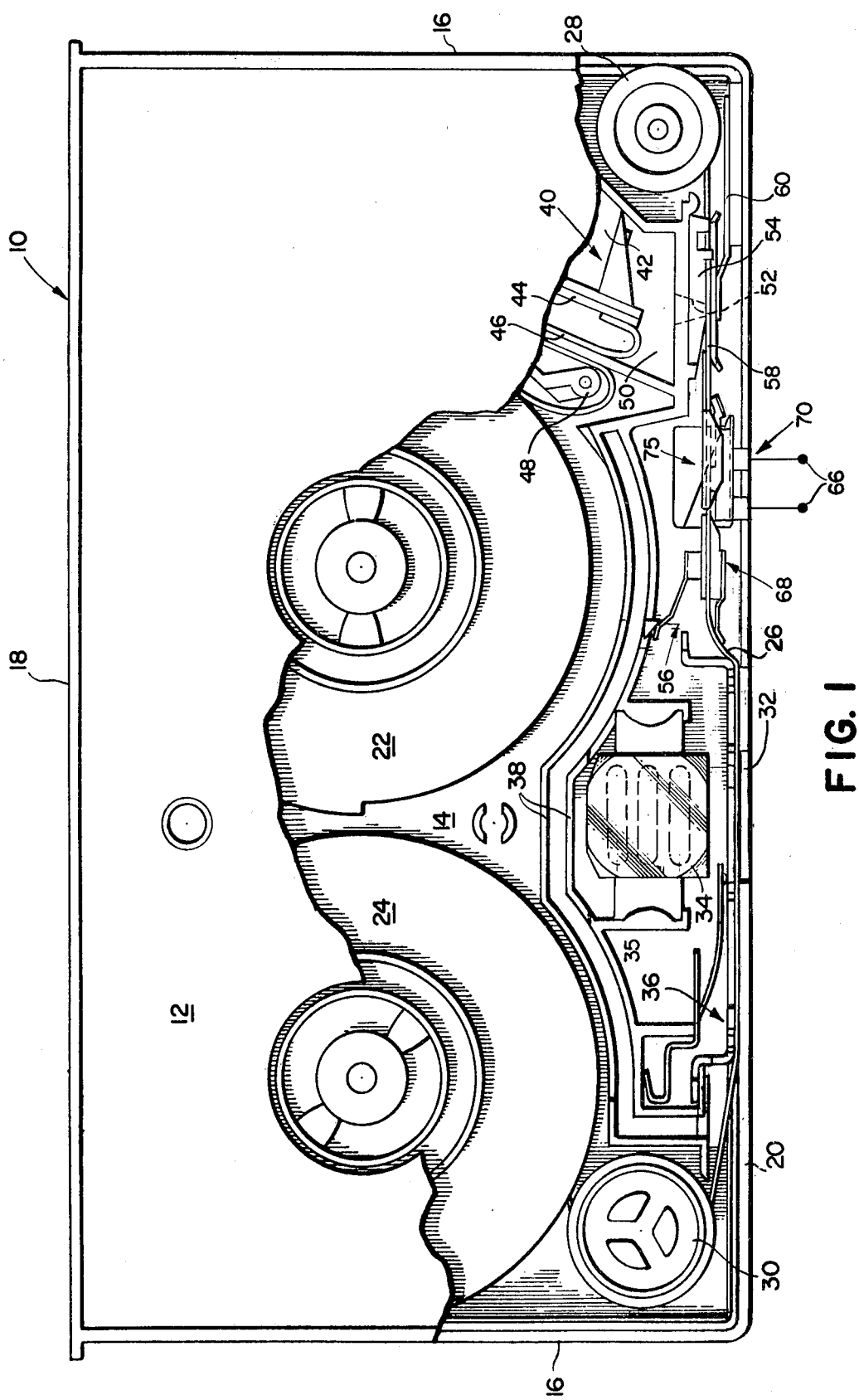
FIG. 1 is a diagrammatic view, in elevation, partially cut away to show the interior of a compact multipurpose film handling cassette embodying features of the present invention.

The multipurpose film cassette with which the present invention is particularly adapted for use is illustrated in FIG. 1 to include an outer housing 10 in the shape of a rectangular parallelepiped having front and back walls 12 and 14 respectively, end walls 16, a top wall 18 and a bottom wall 20. Mounted for rotation between the front and back walls are supply and takeup reels 22 and 24 to which supply and takeup leader ends of the film strip 26 are affixed by appropriate means. In passing from the supply reel 22 to the takeup reel 24, the film strip 26 is trained through a series of generally straight runs defined in part by an idler roller and a snubber roller 28 and 30, respectively, and a second idler roller disposed generally in the upper right hand corner of the cassette, not shown in the drawings. As shown, the film strip 26 is trained over an opening 32 in the bottom wall 20, both for exposure in an appropriate camera (not shown) and also for projection, in a viewer/processor shown only in part in FIGS. 2 and 3, by illumination passed through a reflecting prism 34 mounted in the cassette behind the opening 32 and the film strip 26 passing thereby. Situated behind the prism are air vent openings 35 in the back wall 14 to permit the circulation of air over the prism 34 for cooling and also for drying after film strip processing in the manner to be described below. A pressure plate 36 is mounted in the cassette housing behind the cassette opening 32 to support the segment of the film strip passing thereby. The air vents 35, the pressure plate 36 and the prism 34 are isolated from the supply and takeup spools 22 and 24 by a labyrinth-type light seal formed in part by internal ribs 38.

Also contained in the cassette housing 10 is a processor generally designated by the reference numeral 40 which is operative after exposure of the film strip 26 to deposit a layer of processing fluid onto the emulsion bearing side of the film strip over the entire length thereof. The processor includes a reservoir 42 in which the processing fluid is initially sealed by a tear tab closure 44 secured over a planar opening in the reservoir.

To enable release of the processing fluid from the initially sealed reservoir 42 after exposure of the film strip 26, a pull strip 46 having one end releasably secured to the tear tab closure 44 is trained about a pair of guide rollers, only one of which, 48, is shown in the drawing so that a free end (not shown) of the pull strip may be engaged by an aperture (not shown) in the supply end of the film strip 26 upon initial rewind movement thereof. The exact operation of the pull strip 46 is described fully in U.S. Pat. No. 3,895,862 of Joseph A. Stella, et al., which is assigned to the assignee of the present invention. Briefly, the free end portion of the pull strip 46 rides against the outermost convolution of the film strip contained on the supply spool 22 as the film strip is paid out from the supply spool to the takeup spool 24 during exposure of the film strip. Reversal of the film strip direction of movement during rewind, however, effects an attachment of the pull strip 46 to the supply end leader of the film strip so that the pull strip will be wound with the film onto the supply spool 22 as rewind continues. As a consequence, the tear tab closure 44 will be drawn away from the reservoir opening to release the processing fluid to a second chamber 50 in the processor 40.

The chamber 50 is located over an opening 52 in a processing fluid applicator nozzle 54 and the released processing fluid passes into the chamber and through the nozzle opening for application to the emulsion bearing side of the film strip 26. Incorporated in the processor 40 is a nozzle valve 56 which, as later explained with respect to the operation of the cassette, is utilized to close off the processor nozzle 54 and thereby disable the processor following treatment of the film strip 26 with the processing fluid. In relation to the nozzle opening 52, the valve 56 is positioned initially to the left as shown in FIG. 1 or upstream of the nozzle opening in terms of the direction of film strip travel during rewind. Additionally, a pressure pad 58 supported by a leaf spring 60 retains the film strip in operative relation to the nozzle 54 during film strip processing.

It is to be noted that the multipurpose cassette and components thereof described in the preceeding paragraphs represent a cassette structure which in itself is not novel with the present invention. It is important to a full understanding of the present invention, however, that the characteristics and operation of the cassette illustrated in FIG. 1 be understood. Specifically, following exposure of the film strip by incremental advance thereof past the opening 32 in a direction proceeding from the supply spool 22 to the takeup spool 34, rewind is initiated by driving the supply spool to rewind the film strip from the takeup spool 24 back onto the supply spool 22 as set forth above. This procedure is effected by removing the cassette from the camera in which it is exposed and placing it in a cassette-receiving well 62 provided in a processor/viewer device equiped with appropriate means for driving the supply spool 22 to rewind the film strip 26 in the manner described. During such rewinding movement, the emulsion side of the film strip will be drawn past the nozzle 52 to receive a layer of processing fluid which has been released from the reservoir 42 as a result of the tear tab closure 44 having been removed in the manner described above.

Prior to a discussion of the process mode or condition indicator of the present invention, the viewer apparatus with which the cassette is adapted to be used will be briefly described. As mentioned above, the cassette 10 is arranged for processing and projection operations within a viewer well 62 (see FIGS. 2 and 3) with its projection station opening 32 in registration with an aperture plate (not shown) provided in the bottom of the well 62. The cassette front wall is provided with an illumination aperture (not shown) located in alignment with the prism 34 and with a conventional projection lamp (not shown). During projection, the latter is configured to direct illumination into the cassette and then outwardly through incremental segments of the film 26 as such segments are progressively advanced across the opening 32. The viewer/processor is provided with suitable drive spindles (not shown) mounted alongside the well 62 for displacement into engagement with the supply and takeup reels once the cassette is properly located in the apparatus. Mounted beneath the cassette-receiving well 62 are conventional projector components (not shown) such as a claw mechanism, a rotary shutter and a projection lens assembly, the latter being configured to transmit the image bearing illumination emanating from the opening 32 and focus it in the plane of a viewing screen.

Figure 2:
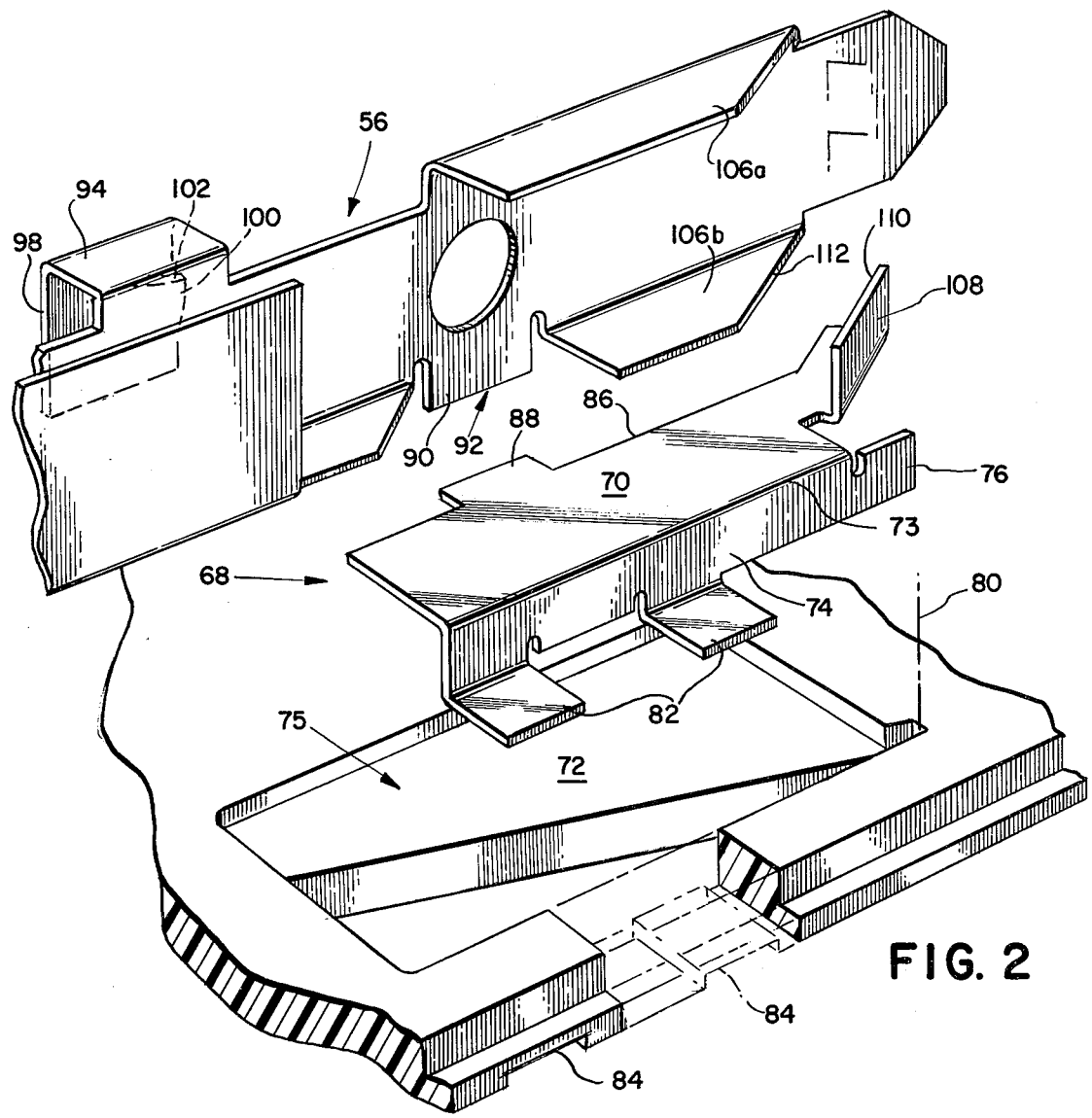
FIG. 2 is an enlarged perspective view of a portion of the cassette in the region of the process mode indicator illustrating the manner of mounting such an indicator in a cassette side wall.
Figure 3:
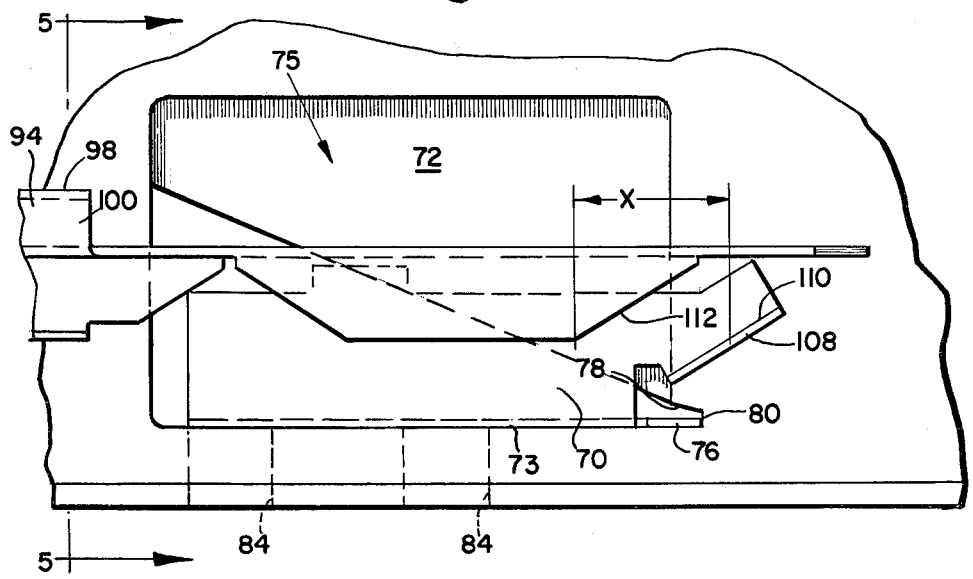
FIG. 3 is an enlarged showing of the portion of FIG. 1 illustrating the process mode switch and the slide valve in their unprocessed cassette condition.

Referring now to FIGS. 2 and 3, located near the bottom 64 of the cassette receiving well 62 in position to cooperate with a cassette-contained element to be described below, are a pair of viewer process mode terminals 66, only one of which is physically shown in the referenced figures. Both process mode terminals 66 are shown schematically in FIG. 1. As set forth above, the cooperation of the cassette-contained process mode terminals 66 will signal the viewer/processor-contained operating cycle selector to condition the control system for either an unprocessed-film operating cycle or a processed-film operating cycle.

Figure 4:
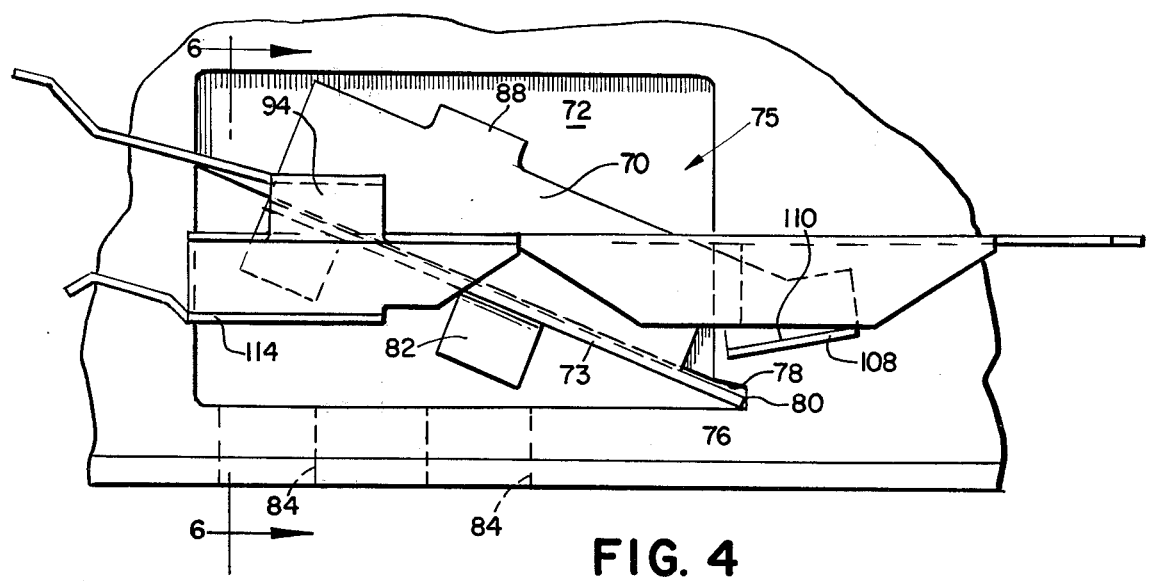
FIG. 4 is a view similar to FIG. 3 showing the displacement of the process mode indicator following partial advancement of the slide valve.
Figure 5:
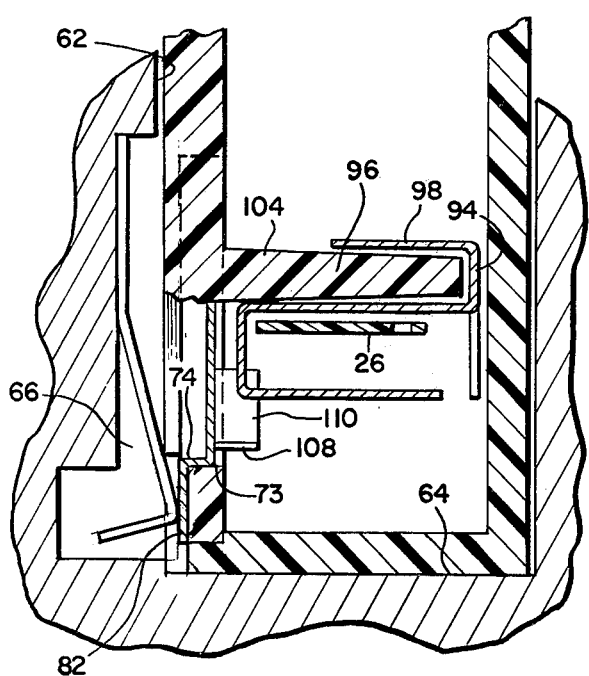
FIG. 5 is a view similar to a view which would be taken along the lines 5—5 of FIG. 3, however, also showing the unprocessed film cassette in operative engagement within a film processing apparatus.
Figure 6:
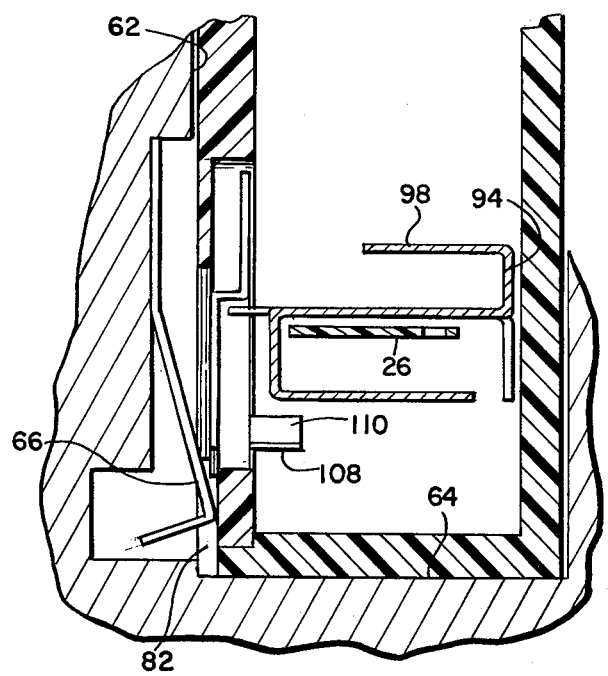
FIG. 6 is a view similar to FIG. 5, taken along the lines 6—6 of FIG. 4 showing a processed film cassette in operative engagement within a film processing apparatus.

Turning now to the novel process mode switch of the present invention, reference is made to FIGS. 1, 3 and 5 wherein the switch 68 is shown mounted in a multipurpose film cassette 10 in its position wherein it will signal an unprocessed condition of the cassette-contained film. With further reference to FIG. 2, wherein the switch 68 and the slide valve 56 are shown removed from their mounted positions in the cassette, the switch 68 comprises a one-piece element which includes a main flat mounting plate portion 70 which is adapted to be received in confronting relation with upwardly facing surface 72 of a process mode switch receiving recess 75 formed in the back wall 14 of the cassette housing 10. Extending from the front edge 73 of the plate is a downwardly extending elongated portion 74 which includes a free standing extended portion 76 at its right hand side. The extension 76 is adapted to be received in a mating recess or cavity 78 which forms an extension of the main process mode switch receiving recess 75. The extension receiving cavity 78 is shaped such that it tapers from a width substantially wider than the width of the extension 76 to a substantially narrower width at its inner dead end. Such an arrangement permits the entire process mode switch 68 and the other appendages carrier thereby, which will be described hereinbelow, to be rotated from the position shown in FIG. 3 into the interior of the cassette, still being retained within the switch receiving recess 75, to a position as shown in FIG. 4. During such movement, the entire switch rotates about a substantially fixed pivot point 80 defined by the engagement between the extension 76 and the extension receiving recess 78. The manner in which such rotational movement is effected upon the process mode switch 68 will also be described in detail hereinbelow.

As best seen in FIG. 2, and with further reference to FIGS. 3 and 5, the process mode switch 68 is provided with a pair of process mode switch contact elements 82 extending from the bottom edge of the downwardly extending portion 74. These elements extend outwardly of the cassette in a direction parallel to the plane of the main mounting plate 70 of the switch. Each of these process mode switch contacts 82 is received in a respective receiving channel 84 provided in the cassette structure and communicating the interior of the cassette switch receiving recess 75 to the exterior of the cassette housing 10. As best seen in FIG. 5, wherein only one of such contacts is shown, when received in its respective channel 84, each of the process mode switch terminals 82 provides a planar contact area 86 forming a portion of the outer wall of the cassette when the switch is in its initial position, as shown in FIGS. 3 and 5. The width of the two process mode switch terminal receiving channels 84 is configured to be greater than the width of the terminals themselves so that when the process mode switch 68 is rotated from the position illustrated in FIG. 3 to that illustrated in FIG. 4, each of the process mode terminals 82 may readily be withdrawn from its respective channel 84.

Extending from the rearward edge 86 of the main mounting plate 70 of the process mode switch 68 is a process mode switch retaining projection 88. This projection lies in the same plane as the mounting plate 70 and, accordingly, is also in confronting relation with the upwardly facing surface 72 of the cassette switch receiving recess 75. The back edge of this extension 88 is adapted to be engaged by a forwardly facing surface 90 of a downwardly extending extension 92 carried by the above-referenced processor disabling slide valve 56, which valve will be described in somewhat more detail hereinbelow. However, it should be appreciated that when in the position illustrated in FIGS. 2 and 3, the projection 88 and the downwardly extending portion 92 of the slide valve 56 are in confronting relationship with one another and, as a result, the process mode switch 68 is restrained in the position shown in FIG. 3 and not permitted to rotate inwardly to the cassette recess 72. Such an arrangement thus assures that the pair of process mode switch terminals 82 will remain within the rectangular channels 84 provided in the cassette housing 10 as long as the slide valve 56 is in its initial position.

With reference now to FIGS. 2, 3 and 5, it will be seen that the displaceable nozzle valve 56 as installed within the cassette comprises in part a substantially inverted U-shaped sheet metal section 94 which is adapted to slidably engage an upstanding structural portion 96 of the interior of the cassette adjacent the process mode switch 68. The exact configuration of this processor disabling valve 56 will not be described in detail; however, the valve as depicted in the drawing figures of the present application is described in considerable detail in U.S. Pat. No. 4,106,042 entitled "Multipurpose Film Cassette Having A Processor Disabling Valve Retention Arrangement" of Frank M. Czumak, et al., and assigned to the assignee of the present invention, which patent is herein incorporated by reference.

As best seen in FIGS. 2 and 3, the inside leg 98 of the U-shaped element 94 is provided with an inwardly extending detent 100 formed by making a cut parallel to the direction of movement of the film strip 26 in the inside leg of the U-shaped element and bending the portion of the leg underlying the cut inwardly towards the structural portion 96 of the cassette upon which it is mounted. With such an arrangement, the top edge 102 of the detent 100 engages the rear surface 104 of the upstanding structural portion 96 of the cassette when the slide valve 56 is installed thereon, thereby assuring retention of the slide valve in its installed position. With further reference to these figures, it will be seen that the U-shaped portion 94 and the detent 100 carried thereby extend beyond the extremes of the structural portion 96 and, because of the inclined slope of the detent, such engagement between the detent 100 and the structural wall 96 will in no way interfere with movement of the slide valve 56, to the right as viewed in FIGS. 2 and 3, when the valve is advanced by the film strip upon termination of the processing operation.

With this in mind, it will be seen, again with reference to FIGS. 2 and 3, that the slide valve 56 comprises a pair of structural side cams 106a, b whose conventional function has been to displace the pressure pad 58 away from engagement with the film strip 26 to permit unrestricted travel of the film through the processor region upon displacement of the slide valve to the right following the processing mode. As best seen in FIG. 3, the lowermost of these cams 106b is configured to engage an upstanding process mode switch tab 108 which extends from the main mounting plate 70 of the switch 68 at such a location with respect to the fixed pivot point 80 such that engagement of the angled surface 110 of the tab 108 by the mating inclined surface 112 of the cam 106b results in the desired pivoting movement of the entire process mode switch 68 from the position illustrated in FIG. 3 to that illustrated in FIG. 4. Accordingly, advancement of the slide valve following processing results in movement of the process mode switch to a final position wherein each of the process mode switch terminals 82 has been withdrawn from its respective channel 84 and lies in a position within the process mode switch recess 72 such that neither terminal may be contacted by the viewer/processor terminals 66.

The slide valve 56 is illustrated in FIG. 4 only partially advanced to its final position wherein it seals off the processor nozzle opening 52, such final position being substantially to the right of the process mode switch 68 than as shown in FIG. 4. When in this final position, the extension 114 of the slide valve 56 on its left hand side as viewed in FIG. 4 which serves to guide the advancing film strip thereby also serves to engage the angled surface 110 of the upstanding portion 108 of the process mode switch 68, such engagement assuring that the process mode switch 68 remains in its desired final position as shown in FIG. 4. Such engagement thus assures that, following the processing operation, the process mode switch terminals 82 will remain within the confines of the cassette and will not be engaged by the viewer terminals 66 during subsequent projection cycles.

With reference to FIG. 3, it will be seen that the slide valve 56 must advance a distance X before the leading surface of the side cam 106b engages the angled surface 110 of the upstanding portion 108 of the process mode switch 68 to result in initiation of the rotation of the switch to its final position. It will be noted that the position of the engagement between the downwardly extending portion 92 of the slide valve 56 and the rearward projection 88 of the process mode switch is such to insure that these two elements are no longer in confronting relationship with one another when the valve has advanced through the distance X and rotation of the process mode switch 68 is initiated. Such an arrangement assures that the slide valve and/or the process mode switch will not jam during movement of the slide valve to its final position.

Accordingly, it should be appreciated that a simple one-piece process mode switch has been provided for a multipurpose film handling cassette. The switch comprises a unitary element which may be readily manufactured by mass production manufacturing techniques and which may be installed in such a cassette in a simple one-step operation with little possibility of being improperly installed, i.e., for example, upside down or reversed left to right. The device is movable from a first position wherein it serves to provide a conductive path between a pair of terminals and in which position it is positively retained by a valve which is slidably displaced upon termination of the processing cycle of the cassette to a second position wherein it no longer provides such electrical contact and wherein it is again positively restrained by a portion of the slidable valve element.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A photographic film cassette for use with other apparatus, said cassette configured for depositing a coating of processing fluid on a moving run of a cassette retained photographic film strip to develop viewable images thereon, said cassette comprising:

a cassette housing;

means responsive to a drive arrangement of the other apparatus for advancing the film along a given path within said housing;

means actuatable in accordance with a predetermined processing operation of said cassette for depositing processing fluid on the advancing film strip;

means for indicating to the other apparatus the processed or unprocessed condition of the film strip, said indicating means comprising an indicating element mounted within said housing for rotation about a fixed axis from a first position wherein said indicating element will operatively engage a signal generating arrangement carried by the other apparatus when said cassette is in operative engagement with said other apparatus, thereby indicating a given process condition of the film in the cassette, to a second position wherein said indicating element will not operatively engage the signal generating arrangement of the other apparatus when the cassette is in operative engagement with the other apparatus thereby indicating another different process condition of the film in the cassette; and selectively operable means responsive to said predetermined processing operation of said cassette for engaging and rotating said indicating means about said fixed axis from its said first position to its said second position thereby indicating said change in said process condition from said given to said other condition.

2. The apparatus of claim 1 wherein said means for engaging and rotating said indicating means further comprises means for retaining said indicating element in its said first position prior to said predetermined processing operation of said cassette.

3. The apparatus of claim 1 wherein said predetermined processing operation includes advancing said film in a given direction for deposition of said fluid, said means for engaging and rotating said indicating means comprises a member slidably mounted within said cassette for movement, responsive to film advancement in said given direction, from a first position prior to deposition of the processing fluid to a second position following initiation of deposition of the processing fluid, said movement of said slidably mounted element from said first position to said second position effecting said rotation of said indicating means from its said first to its said second position.

4. The apparatus of claim 1 wherein said indicating element comprises an electrically conductive element configured to engage a pair of electrical contacts carried by the other apparatus.

5. The apparatus of claim 4 wherein said predetermined processing operation includes advancing said film in a given direction for deposition of said fluid, said means for engaging and rotating said indicating means comprises a member slidably mounted within said cassette for movement, responsive to film advancement in said given direction, from a first position prior to deposition of the processing fluid to a second position following initiation of deposition of the processing fluid, said movement of said slidably mounted element from said first position to said second position effecting said rotation of said indicating means from its said first to its said second position.

6. The apparatus of claim 5 wherein said indicating element is formed from a sheet material and comprises a substantially flat base portion configured for cooperation with a supporting interior wall of said cassette housing, said base including a first extension for cooperating with mating structure of said cassette housing to define said fixed axis and to support said base portion in cooperation with said interior wall for rotation of said base portion about said axis and parallel to said support wall.

7. The apparatus of claim 6 wherein said cassette housing is provided with two openings therein adjacent said indicating element and wherein said base portion further includes two contact elements carried thereby, each of said contact elements occupying a position adjacent one of said cassette openings wherein each will be in electrical contact with one of said pair of electrical contacts of the other apparatus when said cassette is installed in the other apparatus, and at least one of said contact elements moving to a second position interiorly of said cassette wherein it is not in electrical contact with its respective electrical contact of said other apparatus when said indicating element is rotated about said fixed axis to its said second position.

8. The apparatus of claim 7 wherein said base portion further includes an angularly disposed upstanding portion positioned with respect to said fixed axis such that a force imparted upon said upstanding portion by said slidably mounted element as said slidable element moves from its said first position to its said second position will result in said rotation of said indicating element from its said first position to its said second position.

9. The apparatus of claim 8 wherein said base portion of said indicating element includes structural means for engaging a mating structural means of said slidably mounted element for retaining said indicating means in its said first position prior to said predetermined processing operation of said cassette.

* * * * *